US012546062B1

(12) United States Patent
Ahmed et al.

(10) Patent No.: US 12,546,062 B1
(45) Date of Patent: Feb. 10, 2026

(54) PROCESS FOR PRODUCING FIBER-REINFORCED BIO-COMPOSITES INCORPORATING AGRICULTURAL WASTE FIBERS, BIO-BASED BINDERS, AND CARBON NANOMATERIALS

(71) Applicant: United Arab Emirates University, Al Ain (AE)

(72) Inventors: Waleed Ahmed, Al Ain (AE); Noura Almazrouei, Al Ain (AE); Ali Al Marzouqi, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/263,977

(22) Filed: Jul. 9, 2025

Related U.S. Application Data

(62) Division of application No. 18/936,016, filed on Nov. 4, 2024, now Pat. No. 12,392,087.

(51) Int. Cl.
| | | |
|---|---|---|
| *D21H 13/50* | (2006.01) | |
| *C08L 97/02* | (2006.01) | |
| *D21C 3/02* | (2006.01) | |
| *D21C 3/22* | (2006.01) | |
| *D21H 11/12* | (2006.01) | |

(52) U.S. Cl.
CPC .............. *D21H 13/50* (2013.01); *C08L 97/02* (2013.01); *D21C 3/02* (2013.01); *D21C 3/228* (2013.01); *D21H 11/12* (2013.01)

(58) Field of Classification Search
CPC .......... D21H 13/50; D21H 11/12; C08L 97/02
See application file for complete search history.

(56) References Cited

U.S. PATENT DOCUMENTS

| | | | | |
|---|---|---|---|---|
| 3,719,514 A | * | 3/1973 | Taylor | .................... D21H 19/54 |
| | | | | 106/214.1 |
| 11,359,095 B1 | | 6/2022 | Abu-Jdayil | |
| 2004/0118540 A1 | | 6/2004 | Garnier | |
| 2009/0074228 A1 | * | 3/2009 | Mango, III | .......... H04R 31/003 |
| | | | | 381/432 |
| 2010/0206504 A1 | * | 8/2010 | Akiyama | ................ D21H 21/14 |
| | | | | 977/734 |
| 2019/0022975 A1 | | 1/2019 | Hurt | |
| 2022/0127788 A1 | | 4/2022 | Nelson | |

FOREIGN PATENT DOCUMENTS

| | | | | |
|---|---|---|---|---|
| CN | 113699824 A | | 11/2021 | |
| EP | 3872172 A1 | | 9/2021 | |
| JP | 2024007512 A | | 1/2024 | |
| KR | 101264269 B1 | * | 5/2013 | ............. C01B 32/20 |

OTHER PUBLICATIONS

English Machine Translation of KR101264269B1 from espacenet.com, 2013. (Year: 2013).*

* cited by examiner

*Primary Examiner* — Anthony Calandra
(74) *Attorney, Agent, or Firm* — MH2 Technology Law Group, LLP

(57) ABSTRACT

The present disclosure pertains to fiber-reinforced bio-composites incorporating agricultural waste fibers, bio-based binders, and carbon nanomaterials, and a process for their preparation. The bio-composites of the present disclosure offer superior mechanical and thermal properties while being environmentally sustainable.

8 Claims, 3 Drawing Sheets

PROCESS FOR PRODUCING FIBER-REINFORCED BIO-COMPOSITES INCORPORATING AGRICULTURAL WASTE FIBERS, BIO-BASED BINDERS, AND CARBON NANOMATERIALS

CROSS REFERENCE TO RELATED APPLICATION

This application is a divisional of U.S. application Ser. No. 18/936,016, filed 4 Nov. 2024, the entire disclosure of which is incorporated herein by reference.

TECHNICAL FIELD

The present disclosure pertains to the field of bio-composite materials. In particular, the present disclosure pertains to bio-composite materials comprising plant biomass, a bio-binder, and carbon nanomaterial, and a process for their preparation. The bio-composite of the present disclosure offers superior mechanical and thermal properties while being environmentally sustainable.

BACKGROUND

Environmental pollution is amongst the most severe humanity problems, being the lead cause of mortality and morbidity. It emanates from the release of effluents and wastes resulting from urbanization, industrialization, population growth, mining, and others to the environment, and more so waterways. Close to 12 million tons of plastic and other debris enter the marine environment annually, contributing to the exponentially rising pollution to the marine life and environment. When these pollutants enter the marine environment, they contribute to acidification of oceans, nutrient pollution (eutrophication), addition of toxins, and increase in microplastics which endanger marine life through ingestion, disruption of habitats, and even entanglement. This indicates that marine pollution is an environmental issue that exacerbates to a public health issue considering the food-chain interplay. In this regard, it is important to take heed of marine and other forms of environmental pollution.

Bio-composites have gained attention as a sustainable solution to reduce environmental pollution in various ways. The attributes of bio-composites such as their ability to decompose naturally, reduced toxin emissions, energy efficiency etc. make bio-composites a promising option for addressing environmental pollution and promoting sustainability.

While bio composites offer many environmental benefits, achieving superior mechanical and thermal properties can be challenging. This is because natural fibers often have lower mechanical strength and thermal stability compared to synthetic fibers. Poor adhesion between the natural fibers leads to weak interfacial bonding, and the fibers absorb moisture leading to dimensional instability and reduced mechanical properties. These fibers also have low thermal stability. Addressing these issues often requires modifications to fiber composites, or development of new bio-based composites with enhanced performance.

To address these challenges, researchers have explored alternative, low-cost carbon sources and waste materials for the production of bio-composites.

Carbon nanomaterials, such as carbon nanotubes (CNTs) and graphene, have been explored as reinforcing agents in bio-composites to enhance their mechanical and thermal properties. To achieve composites with enhanced thermal and mechanical behaviors, stronger materials have been used as enhancing agents in composite matrices.

However, the field of carbon nanomaterials in bio-composites is still relatively new, and the process of customizing the mechanical strength and thermal properties of bio-composites reinforced with carbon nanomaterials is complex. It needs careful material selection, processing techniques, and evaluation of combinations of various materials to arrive at a bio-composite with desired properties.

Palm trees, which are extensively spread across several Asian nations, consist of significant amounts of non-food products, including leaves, which end up disposed as waste, leading to environmental pollution. There are over 120 million palm trees in the world with each tree producing approximately 20% of leaves annually, most of which end up in landfills, leading to extensive environmental damage. Therefore, there is a need to convert the biomass from palm tree leaves to usable forms in a bid to reduce environmental pollution.

Some natural waste materials can also be used as bio-binders, leading to environmentally sustainable engineering practices through reduction of waste and preservation of the resources.

Using bio-based materials is an approach that combines waste valorization with the production of high-value bio-products, contributing to a circular economy and sustainable development. Continuous research is required to improve yields, reduce costs, and ensure product quality. Achieving consistent quality and desired mechanical and thermal properties in the bio-composites can be challenging, which is crucial for the performance of the composite materials.

With growing environmental concerns and advances in this field, the development of more sustainable and eco-friendly alternatives is gaining momentum, providing consumers with more options that align with environmental values. Bio-composites reinforced with carbon nanomaterials remains as an area for research, as there is limited industrial experience and knowledge compared to more established materials. Therefore, there is a need to adopt and develop bio-composites for new high performance natural materials.

SUMMARY OF THE DISCLOSURE

This summary is intended to introduce, in simplified form, a selection of concepts that are further described in the detailed description. This summary is merely presented as a brief overview of the subject matter described and claimed herein and does not aid in determining the scope of the claimed subject matter.

The present disclosure provides a bio-composite material comprising a plant biomass, a bio-binder, and a carbon nanomaterial.

One aspect of the present disclosure provides a bio-composite material comprising: at least 80 wt % of a plant biomass; a bio-binder; and a carbon nanomaterial, resulting in an environmentally sustainable composite material.

Another aspect of the present disclosure provides a process for the preparation of bio-composite material, comprising:
 a) preparing a mixture comprising a plant biomass, a bio-binder, and a carbon nanomaterial;
 b) compressing the mixture obtained in step a) to obtain the bio-composite material.

DETAILED DESCRIPTION

Figure 1:
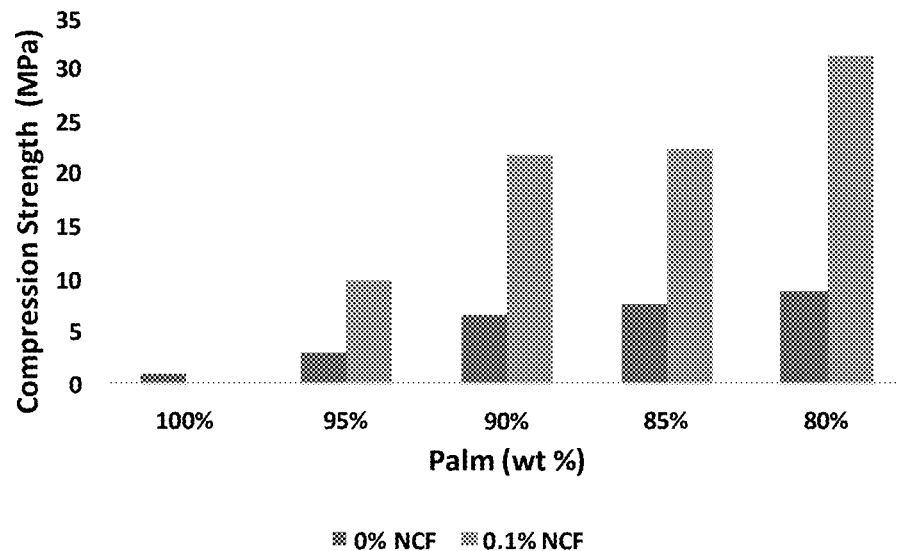
FIG. 1 illustrates compression strength of the bio-composite material.
Figure 2:
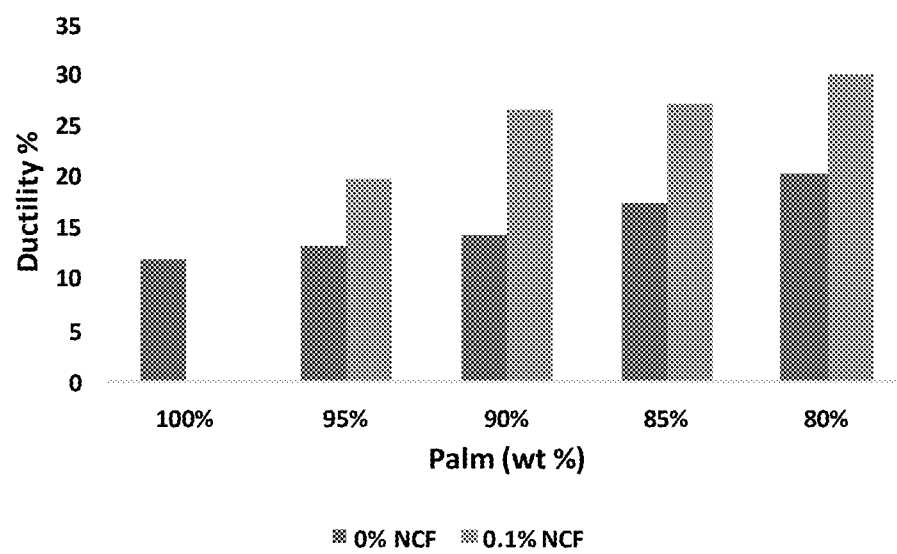
FIG. 2 illustrates ductility of the bio-composite material.
Figure 3:
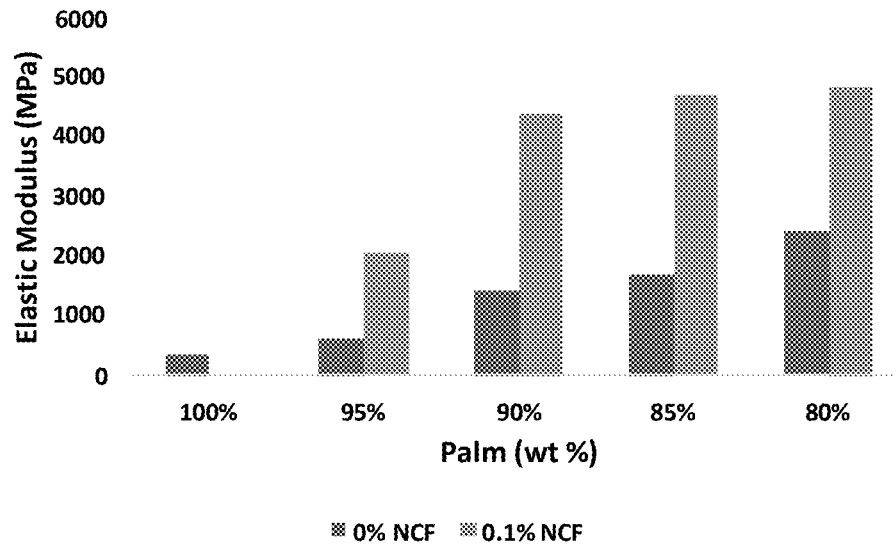
FIG. 3 illustrates elastic modulus of the bio-composite material.
Figure 4:
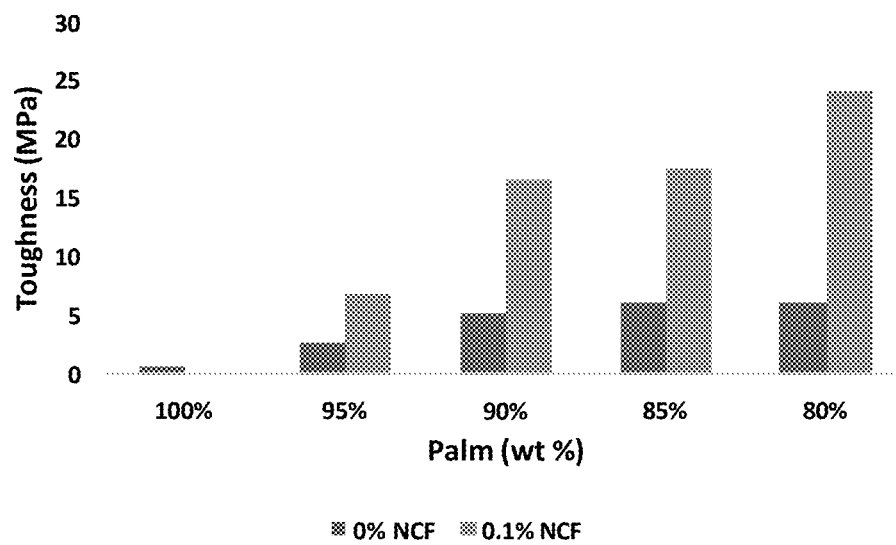
FIG. 4 illustrates toughness of the bio-composite material.
Figure 5:
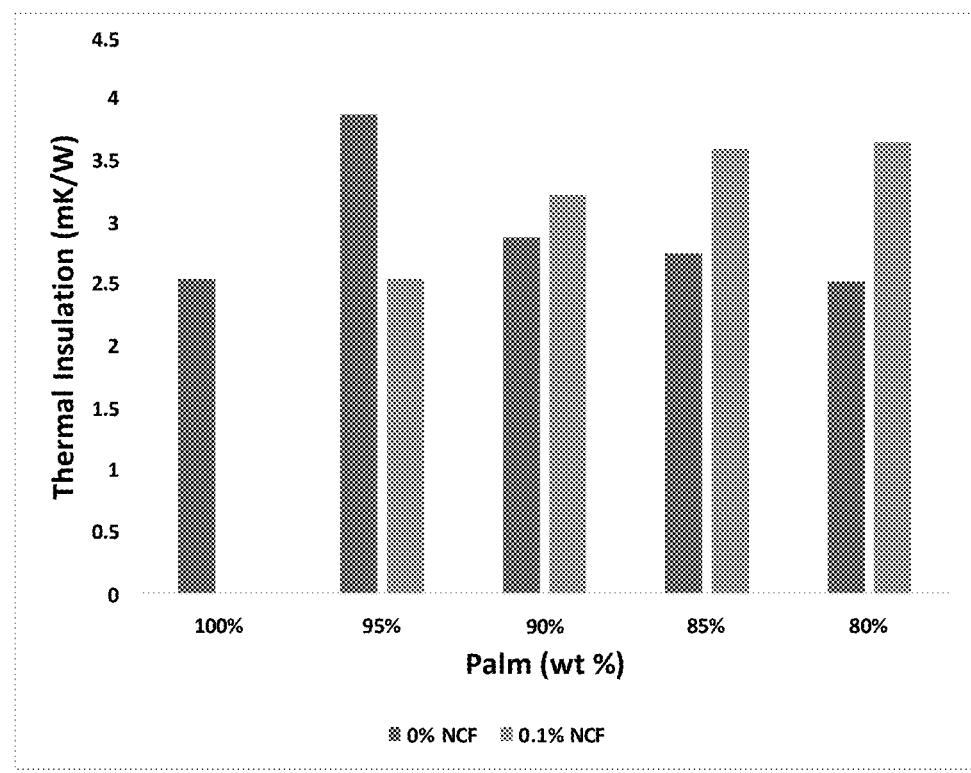
FIG. 5 illustrates thermal insulation of the bio-composite material.

The objective of the present disclosure is to provide a bio-composite material having superior mechanical and thermal properties while being environmentally sustainable. It is also an objective of the present disclosure to arrive at the bio-composite material using a process which is environmentally friendly and is cost effective.

The present disclosure can be understood more readily by reference to the following description, taken in conjunction with the accompanying Figures and Examples, all of which form a part of this disclosure. At the very outset of the detailed description, it may be understood that the ensuing description only illustrates a particular form of this invention. However, such a particular form is only an exemplary embodiment, and without intending to imply any limitation on the scope of this invention. Accordingly, the description is to be understood as an exemplary embodiment and teaching of invention and not intended to be taken restrictively.

Before the present disclosure or methods of the present disclosure are described in greater detail, it is to be understood that the specific products, methods, processes, conditions, or parameters, are not limited to embodiments described, as such may, of course, vary. It is also to be understood that the terminology used herein is for the purpose of describing embodiments only and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the methods. Where the stated range includes one or both limits, ranges excluding either or both of those included limits are also included in the methods. Certain ranges are presented herein with numerical values being preceded by the term "about." The term "about" is used herein to provide literal support for the exact number that it precedes, as well as a number that is near to or approximately the number that the term precedes. For example, "about" can mean within one or more standard deviations, or within +30%, 25%, 20%, 15%, 10% or 5% of the stated value.

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

It is appreciated that certain features of the methods, which are, for clarity, described in the context of separate embodiments, may also be provided in combination in a single embodiment. Conversely, various features of the methods, which are, for brevity, described in the context of a single embodiment, may also be provided separately or in any suitable sub-combination. All combinations of the embodiments are specifically embraced by the present invention and are disclosed herein just as if each and every combination was individually and explicitly disclosed, to the extent that such combinations embrace operable processes and/or composites/scaffolds.

The articles "a" and "an" are used herein to refer to one or to more than one (i.e., to at least one) of the grammatical object of the article. By way of example, "an element" means one element or more than one element. As used herein, the term "comprises", "comprising", or "comprising of" is generally used in the sense of include, that is to say permitting the presence of one or more features or components. The term "comprises", "comprising", or "comprising of" when placed before the recitation of steps in a process or method means that the process or method encompasses one or more steps that are additional to those expressly recited, and that the additional one or more steps may be performed before, between, and/or after the recited steps.

Reference throughout this specification to "certain embodiments", "further embodiments", "specific embodiments", "further specific embodiment", "one embodiment", "a non-limiting embodiment", "an exemplary embodiment", "some instances", or "further instances", means that a particular feature, structure or characteristic described in connection with the embodiment may be included in at least one embodiment of the present disclosure. As used herein, the terms 'include', 'have', 'comprise', 'contain' etc. or any form of said terms such as 'having', 'including', 'containing', 'comprising' or 'comprises' are inclusive and will be understood to imply the inclusion of a stated element, integer or step, or group of elements, integers or steps, but not the exclusion of any other element, integer or step, or group of elements, integers or steps.

The use of any and all examples, or exemplary language (e.g., "such as") provided with respect to certain embodiments herein is intended merely to better illustrate the disclosure and does not pose a limitation on the scope of the disclosure otherwise claimed. As used herein, the term "invention", "present invention", "disclosure" or "present disclosure" as used herein is a non-limiting term and is not intended to refer to any single embodiment of the particular invention but encompasses all possible embodiments as described in the specification. The terms "process(es)" and "method(s)" are considered interchangeable within this disclosure.

The term bio-composite material refers to materials made from natural fibers (like wood, straw, or plant fibers) combined with other biodegradable materials. These materials are more environmentally friendly than traditional composites because they come from renewable sources and can break down over time. The terms "bio-composite materials", and "bio-composites" are used interchangeably throughout the draft.

The present disclosure provides a bio-composite material comprising a plant biomass, a bio-binder, and a carbon nanomaterial. In one aspect, the present disclosure provides a bio-composite material comprising: at least 80 wt % of a plant biomass; a bio-binder; and a carbon nanomaterial, resulting in an environmentally sustainable composite material.

The plant biomass may be a whole plant, any specific part of the plant, or plant processing byproducts, and is selected from a group comprising leaves, rachis, stems, roots, flowers, fruits, seeds, waste, and other components. In certain embodiments, the plant biomass employed for the purposes of the present invention can be obtained from palm tree, sugarcane, rice husk, coconut coir, corn stover, wheat straw, wood residues, switch grass and the like, or their mixtures. These sources contribute to reducing waste and promote the use of renewable materials in composite applications.

In an embodiment, specific parts of the plant can be employed in the production of bio-composites, such as leaves, fonds, fibrous material left after extraction of essential materials, fibrous portions of the plants/trees such as coconut coir, palm kernel cake, stems, and stalks, sugarcane bagasse, root materials, etc.

In a further specific embodiment, the plant biomass is obtained from palm tree. In an embodiment, palm waste, including leaves and rachis of the palm tree, which are generally considered as agricultural by-products, is employed as plant biomass for the purposes of the present invention.

The plant biomass can be present in an amount of at least 80 percent of the total weight of the composite. In an embodiment, the plant biomass is present at 80-99.9 wt %, including a wt % of 80, 85, 90, 95 or 99.9 to the total weight of the composite.

The bio-binder employed for the purposes of the present disclosure is selected from a group comprising *Ablemoschus esculentus* (okra) mucilage, guar gum, aloe vera gel, *psyllium* husk, starch, cassava starch, chia seeds, flax seeds, and the like, or mixtures thereof. These are natural binders derived from plant materials.

Incorporating the bio-binders into bio-composites enhances their mechanical strength and thermal properties and also contributes to their sustainability by reducing environmental impact while providing performance benefits.

The bio-binder can be present in an amount of 0.05-2.0 wt % of the total weight of the composite. In an embodiment, the bio-binder is present in an amount of 0.4-1.6 wt %.

In an embodiment, the bio-binder is okra mucilage. Thus, in an embodiment of the bio-composite of the present disclosure, the plant biomass comprises palm waste, and the bio-binder comprises okra mucilage.

In a specific embodiment, the bio-binder is okra mucilage. In a further embodiment, the okra mucilage is extracted from *Abelmoschus esculentus* (okra) and mixed under grams from 0.4-1.6 with a precise volume of distilled water to form a uniform solution. In a preferred embodiment, the amount of water is about 0.5 mL.

The carbon nanomaterial which can be employed for the purposes of the present invention has a size ranging from 10-100 nm. The carbon nanomaterial comprises nano-carbon fiber (NCF), carbon nanotube, carbon nanodot, fullerene, graphene, carbon nanoribbons, and the like, or mixtures thereof. The addition of NCF provides significant mechanical reinforcement, enhancing key properties such as compression strength, yield strength, ductility, elastic modulus, and toughness. This strategic use of NCF offers a level of performance not achievable by conventional natural fiber composites or traditional synthetic materials.

The carbon nanomaterial may be present in an amount of 0.05-0.2 wt % of the total weight of the composite.

In a specific embodiment, the carbon nanomaterial is NCF. In an embodiment, the NCF has a size ranging from 10-100 nm. In some instances, the NCF is present in an amount of about 0.1 wt %.

Thus, in an embodiment, the bio-composite material comprises 80-99.9 wt % of the plant biomass; 0.4-1.6 wt % of the bio-binder; and 0.05-0.2 wt % of the NCF.

The bio-composite may comprise additional components selected from mineral fillers, biopolymers, crosslinking agents, natural resins, plasticizers etc. Incorporating these additional components into bio-composite material can lead to significant improvements in various properties, making them suitable for a wider range of applications. This versatility allows for the tailoring of bio-composites to meet specific performance requirements while promoting sustainability.

In a specific embodiment, the bio-composite material comprises 80-99.9 wt % of palm waste; 0.4-1.6 wt % of okra mucilage; and 0.05-0.2 wt % of NCF. In a further specific embodiment, the bio-composite material comprises 80, 85, 90, 95 or 99.9 wt % of palm waste, 0.4-1.6 wt % of okra mucilage, and about 0.1 wt % of the NCF.

Palm waste and okra mucilage as primary components make the composite highly sustainable. These agricultural by-products are readily available and renewable, reducing reliance on synthetic materials while offering an eco-friendly waste management solution. Integrating nano-carbon fiber further increases the value of the composite without sacrificing its sustainability.

The combination of palm waste, okra mucilage, and nano-carbon fiber results in an eco-friendly, sustainable material with minimized environmental impact, offering an alternative to synthetic composites while maintaining superior performance in terms of strength, flexibility, and thermal resistance.

In an embodiment, the bio-composite material of the present disclosure has a compression strength of 10-40 MPa, ductility of 10-40%, elastic modulus of 1500-5000 MPa, toughness of 5-30 MPa, and/or thermal insulation of 3.00-4.00 m·K/W.

Unlike existing composites that focus primarily on either mechanical strength or thermal insulation, this disclosure offers a unique combination of both. The material not only exhibits superior load-bearing capacity and energy absorption but also provides enhanced thermal insulation, making it versatile for high-performance applications in demanding environments such as aerospace, construction, and protective equipment.

In an embodiment, the bio-composite material of the present disclosure is free of any synthetic polymers or binders, thereby making it a biocompatible product.

In a specific embodiment, the present invention provides a bio-composite material comprising 95 wt % palm waste, and 0.1% NCF. The composite has a compression strength of about 10 MPa; ductility, measured by the ability to undergo plastic deformation before fracture, of about 20%; and an enhanced elastic modulus which improves the stiffness and rigidity of the composite to about 2024 MPa. The composite's toughness, measured by its capacity to absorb energy before fracture, is 6.7 MPa; and its thermal insulation is about 3.64 m·K/W.

In a further specific embodiment, the bio-composite material comprises 90% palm waste and 0.1 wt % NCF. The composite has a compression strength of about 21 MPa; elastic modulus of about 4363 MPa; and the composite's toughness, measured by its capacity to absorb energy before fracture of about 16.5 MPa. The bio-composite shows enhanced insulation with a thermal conductivity reduction, providing better performance in energy-efficiency applications.

In a further specific embodiment, the bio-composite material comprises 85% palm waste and 0.1 wt % NCF. The compression strength is about 21 MPa; ductility, measured by the ability to undergo plastic deformation before fracture is about 27%; and the elastic modulus is about 4691 MPa. The bio-composite shows enhanced insulation with a thermal conductivity reduction, providing better performance in energy-efficiency applications.

In a further specific embodiment, the bio-composite material comprises 80 wt % palm waste, and 0.1% NCF. The composite's compression strength is about 31 MPa; ductility, measured by the ability to undergo plastic deformation before fracture, is about 29%. There is substantial increase in the composite's toughness to about 24 MPa, which is measured by its capacity to absorb energy before fracture. The bio-composite shows enhanced insulation with a thermal conductivity reduction, providing better performance in energy-efficiency applications.

The invention demonstrates consistent and scalable improvement in mechanical properties across various concentrations of palm waste (from 80% to 99.5%). This level of adaptability, combined with significant performance enhancements in strength and toughness, makes the material suitable for a broader range of industrial and structural applications, offering versatility that is not present in other natural fiber composites.

One of the standout features of this composite is its simultaneous improvement in ductility and strength. This is a rare combination in material engineering, where increased strength typically compromises flexibility. The composite's ability to achieve high ductility and impact resistance while maintaining impressive compressive strength is a novel and inventive feature, providing a solution to industries that require materials with both high performance and resilience to dynamic loads.

The nano-carbon fiber's inclusion in a combination of plant biomass and bio-binder enhances both the thermal and mechanical properties simultaneously, providing a balance of insulation, stiffness, and load-bearing capacity, making the composite suitable for use in structural, aerospace, and protective gear applications.

In a specific embodiment, the bio-composite of the present disclosure is an advanced composite material that integrates palm waste, okra mucilage, and nano-carbon fiber (NCF) to significantly enhance its mechanical and thermal properties. This innovative material blend leverages the natural properties of okra mucilage and palm waste, which are typically considered agricultural by-products, to produce a highly functional composite with minimal environmental impact. These improvements enable the composite to handle higher loads and absorb greater energy before failure, making it suitable for high-stress applications such as in aerospace, construction, and protective gear. The inclusion of NCF enhances the thermal insulation properties of the composite, allowing it to be used in environments where both strength and thermal regulation are crucial. This eco-friendly composite offers a sustainable alternative to synthetic materials while delivering superior performance in demanding applications.

Yet another embodiment of the present disclosure provides a building material for construction, automative, aerospace, and protective equipment, comprising the bio-composite of the present disclosure.

Companies involved in industries such as construction, automotive, aerospace, and protective equipment can employ the sustainable composite of the present disclosure for its versatile applications. In construction, it could be used in green building materials and infrastructure projects. The automotive sector could utilize it for lightweight, fuel-efficient vehicles, while aerospace manufacturers might adopt it for its strength and thermal insulation in high-performance parts. Protective equipment manufacturers could also find value in its durability and eco-friendly composition.

Construction and infrastructure industries, particularly those focused on green building and renewable energy projects, would be interested in the composites of the present disclosure for its eco-friendly properties and scalability. Additionally, the aerospace and automotive sectors, which require materials with superior mechanical strength and thermal insulation, would find value in the composite's unique benefits. The growing emphasis on sustainable development across various industries creates a substantial market opportunity for this high-performance, bio-based material Markets Interest.

The present invention also provides a process for preparation of a bio-composite material, the process comprises:
  a) preparing a mixture of plant biomass, a bio-binder, and a carbon nanomaterial; and
  b) compressing the mixture obtained in step a) to obtain the bio-composite.

In an embodiment, the mixture comprising the plant biomass, bio-binder, and carbon nanomaterial employed in step a) is obtained by a process comprising the steps of:
  i) mixing the bio-binder with a solvent;
  ii) adding carbon nanomaterial to plant biomass; and
  iii) incorporating the mixture of plant biomass and nano-carbon obtained in step ii) into the mixture obtained in step i).

In certain embodiments of the process, the plant biomass, the bio-binder, and the carbon nanomaterials and their quantities are the same as defined in the preceding embodiments.

The solvent employed in step i) can be selected from water, alcohols, acetic acid, glycerol, etc. In an embodiment, the solvent is water. The solvent may present at a volume of 0.1 to 10 times of the bio-binder.

In an embodiment, step ii) involves pre-processing of the plant biomass and the carbon nanomaterial by grinding to a powder and uniform mixing before their incorporation into the bio-binder in step iii).

In an embodiment, the compressing in step b) is carried out in a mold using a hot press machine. In a specific embodiment, it is carried out in a cylindrical mold using a hot press machine. The mixture is compressed under a pressure of 10-20 MPa, and at a temperature of 70-100° C. for 2-10 hours.

In an embodiment of the process, the plant biomass is obtained from a group comprising palm tree, sugarcane, rice husk, coconut coir, corn stover, wheat straw, wood residues, switch grass, or mixtures thereof; the bio-binder comprises *Ablemoschus esculentus* (okra) mucilage, guar gum, aloe vera gel, *psyllium* husk, starch, cassava starch, chia seeds, flax seeds, or mixtures thereof; and the carbon nanomaterial comprises a nano-carbon fiber (NCF), carbon nanotube, carbon nanodots, fullerenes, graphene, carbon nanoribbons, or mixtures thereof.

In a further specific embodiment of the process, the plant biomass is a palm waste including leaves and rachis obtained from palm tree at a wt % of 80-99.9 of the total weight of the composite; the bio-binder is okra mucilage extracted from *Ablemoschus esculentus* (okra) at a wt % of 0.6-1.4; and the carbon nanomaterial is a NCF at a wt % of 0.1%.

The process involves introducing the palm waste, including leaves and rachis gradually into the okra mixture at ambient room temperature. The palm waste can be present in varying proportions, comprising 80%, 85%, 90%, 95%, and 99.9% by weight, creating five distinct composite variations.

In a specific embodiment, the process comprises pre-processing of the palm waste and nano-carbon fiber including grinding to a powder and uniform mixing, before their incorporation into the okra mucilage matrix to form a homogeneous composite. This ensures maximum surface area contact and effective fiber reinforcement. In further embodiment, the process comprises compressing the mixture of palm waste, okra mucilage, and a carbon nanofiber under a pressure of 15 MPa at a temperature of 70-100° C. for 1-3 hours.

In an embodiment, the process for producing the bio-composite involves mixing, molding, and compression steps that can be easily scaled for industrial production. The low-energy manufacturing process, combined with widely available natural materials, makes this process both practical and commercially viable without compromising performance. Thus, the process is simple and scalable, making it energy-efficient and commercially viable for large-scale production.

The process may involve optional addition of components selected from mineral fillers, biopolymers, crosslinking agents, natural resins, plasticizers etc.

In a specific embodiment, the plant biomass is waste including leaves and rachis obtained from palm tree at a weight percentage ratio of 80, 85, 90, 95, or 99.9 to the total weight of the composite; the bio-binder is okra mucilage extracted from okra fruit at a wt % of 0.6-1.4; and the carbon nanomaterial is a carbon nanofiber at a wt % of about 0.1%. The manufacturing process is simple and scalable, making it energy-efficient and commercially viable for large-scale production.

The foregoing outlines features of several embodiments so that those skilled in the art better understand the aspects of the present disclosure. Those skilled in the art should appreciate that they may readily use the present disclosure as a basis for designing or modifying other bio-composites. Those skilled in the art should also realize that such equivalent modifications do not depart from the spirit and scope of the present disclosure, and that they may make various changes, substitutions, and alterations herein.

The present disclosure is further described with reference to the following examples, which are only illustrative in nature and should not be construed to limit the scope of the present disclosure in any manner.

EXAMPLES

Example 1

Okra mucilage extracted from *Abelmoschus esculentus* (okra) (0.4-1.6 wt %) was mixed with 0.5 mL of distilled water to form a uniform solution. Nano-carbon fiber (0.1 wt %) was pre-mixed with the palm waste including leaves and rachis (95 wt %) in powder form at ambient room temperature. The nanocarbon mix was added to the okra solution to form a homogenous mixture. The mixture was subjected to compression in a cylindrical mold using a hot press machine at a temperature of about 90° C. and pressure of 15 MPa for a duration of 2 hours to enhance the bonding and strength of the composite material.

Compression strength: 10 MPa
Ductility, 20%
Elastic modulus: 2024 MPa
Toughness: 6.7 MPa
Thermal insulation: 3.64 m·K/W Example 2

Okra mucilage extracted from *Abelmoschus esculentus* (okra) (0.4-1.6 wt %) was mixed with 0.5 mL of distilled water to form a uniform solution. Nano-carbon fiber (0.1 wt %) was pre-mixed with the palm waste including leaves and rachis (90 wt %) in powder form at ambient room temperature. The nanocarbon mix was added to the okra solution to form a homogenous mixture. The mixture was subjected to compression in a cylindrical mold using a hot press machine at a temperature of about 90° C. and pressure of 15 MPa for a duration of 2 hours to enhance the bonding and strength of the composite material.

Compression strength: 21 MPa;
Elastic modulus: 4363 MPa,
Toughness: 16.5 MPa.

Example 3

Okra mucilage extracted from *Abelmoschus esculentus* (okra) (0.4-1.6 wt %) was mixed with 0.5 mL of distilled water to form a uniform solution. Nano-carbon fiber (0.1 wt %) was pre-mixed with the palm waste including leaves and rachis (85 wt %) in powder form at ambient room temperature. The nanocarbon mix was added to the okra solution to form a homogenous mixture. The mixture was subjected to compression in a cylindrical mold using a hot press machine at a temperature of about 90° C. and pressure of 15 MPa for a duration of 2 hours to enhance the bonding and strength of the composite material.

Compression strength: 21 MPa;
Ductility, 27%;
Elastic modulus: 4691 MPa.

Example 4

Okra mucilage extracted from *Abelmoschus esculentus* (okra) (0.4-1.6 wt %) was mixed with 0.5 mL of distilled water to form a uniform solution. Nano-carbon fiber (0.1 wt %) was pre-mixed with the palm waste including leaves and rachis (80 wt %) in powder form at ambient room temperature. The nanocarbon mix was added to the okra solution to form a homogenous mixture. The mixture was subjected to compression in a cylindrical mold using a hot press machine at a temperature of about 90° C. and pressure of 15 MPa for a duration of 2 hours to enhance the bonding and strength of the composite material.

Compression strength: 31 MPa;
Ductility, 29%;
Toughness: 24 MPa.

The invention claimed is:

1. A process for preparation of a bio-composite material, the process comprising:
 a) preparing a mixture of a plant biomass, a bio-binder, and a carbon nanomaterial; and
 b) compressing the mixture obtained in step a) to obtain the bio-composite, wherein the mixture is compressed under a pressure of 10-20 MPa, and at a temperature of 70-100° C. for 2-10 hours.

2. The process of claim 1, wherein the mixture comprising the plant biomass, bio-binder, and carbon nanomaterial employed in step a) is prepared by a process comprising the steps of:

i) mixing the bio-binder with a solvent to form a solution;
ii) mixing the carbon nanomaterial with the plant biomass to form a mixture; and
iii) adding the mixture of plant biomass and nanocarbon obtained in step ii) to the solution obtained in step i).

3. The process of claim 2, wherein the carbon nanomaterial and plant biomass are mixed in powder form in step ii).

4. The process of claim 2, wherein the solvent is present at a volume of 0.1-10 times of the bio-binder.

5. The process of claim 2, wherein the solvent is water.

6. The process of claim 1, wherein compressing in step b) is carried out in a mold using a hot press machine.

7. The process of claim 1, wherein,
the plant biomass is obtained from a group comprising palm tree, sugarcane, rice husk, coconut coir, corn stover, wheat straw, wood residues, switch grass, or mixtures thereof;
the bio-binder comprises *Ablemoschus esculentus* (okra) mucilage, guar gum, aloe vera gel, *psyllium* husk, starch, cassava starch, chia seeds, flax seeds, or mixtures thereof; and
the carbon nanomaterial comprises a NCF, carbon nanotube, carbon nanodots, fullerenes, graphene, carbon nanoribbons, or mixtures thereof.

8. The process of claim 1, wherein
the plant biomass is palm waste including leaves and rachis obtained from palm tree at a wt % of 80-99.9 of the total weight of the composite;
the bio-binder is okra mucilage extracted from okra fruit at a wt % of 0.6-1.4; and
the carbon nanomaterial is NCF at a wt % of 0.1%.

* * * * *